Patented Sept. 6, 1949

2,480,873

UNITED STATES PATENT OFFICE 2,480,873

LUBRICANTS

John M. Musselman, South Euclid, Ohio, assignor to The Standard Oil Company, Cleveland, Ohio, a corporation of Ohio No Drawing. Application December 18, 1944, Serial No. 568,777

12 Claims. (Cl. 252—46.6)

This invention relates to lubricants, more particularly to a lubricating composition comprising a hydrocarbon lubricating oil or grease, the reaction product of a phosphorus sulfide and an oxygen containing organic compound, and an oil-soluble detergent preferably of the sulfonate type. The invention also contemplates the last two named ingredients in admixture as a concentrate for addition to the lubricating oil or grease.

It is an object of the invention to provide a composition suitable for use as a lubricant or to be added to a lubricating oil or grease to inhibit the deterioration of the oil or grease under operating conditions, and in particular to prevent or minimize sludge and acid formation in the oil, and to prevent or minimize the deposition of lacquer, varnish or other deposits on the parts to be lubricated.

Various other objects and advantages will be apparent as the nature of the invention is more fully disclosed.

The lubricating oil or grease which it is sought to improve may be of any desired character or source, depending upon the duty in view. For instance, it may be of 45 to 225 seconds viscosity Universal Saybolt at 210° F. and may be of a Mid-Continent, Pennsylvania, Coastal or other source. Greases and other hydrocarbon lubricants may also be used. The particular hydrocarbon lubricating base is not regarded as critical, since a wide variety of them may be improved in accordance with the invention.

The reaction product of the phosphorus sulfide and the oxygen containing organic compound which is included as an ingredient of the composition and which is referred to as an "additive" is described per se in other applications. A full description of this ingredient, however, is included herein.

In preparing this ingredient of the composition, a phosphorus sulfide is reacted with an oxygen containing organic compound at an elevated temperature. If the proportions of the oxygen containing organic compound and the phosphorus sulfide are such, and the temperature conditions are high enough, the reaction product will contain a substantial amount of sulfur and a lesser amount of oxygen and phosphorus. This is referred to as the preferred embodiment of the additive ingredient of the composition. If these conditions do not obtain, the reaction product is or may contain a thiophosphate. At the conclusion of the reaction, the reaction product is separated from any sludge that is formed containing oxygen and phosphorus, probably in the form of an oxide of phosphorus, or a phosphate if the residue is neutralized during or after manufacture. The reaction may be carried out in a mineral oil or volatile solvent diluent.

In the preferred embodiment of making the additive ingredient of the composition, it is important that the reaction between the oxygen containing organic compound and the phosphorus sulfide be carried out at a higher temperature. In making the so-called "higher temperature" reaction product additive in accordance with the preferred embodiment, the temperature should be above about 270° F. and preferably within the range of 290 to 325° F. Temperatures as high as 450° F. are not harmful but are not required in order that the reaction may proceed at a reasonable rate. Since the use of higher temperatures requires more accurate control and results in greater heat losses, there is no advantage in using a higher temperature than is necessary for the desired reaction. The "lower temperature" product may be made at 175 to 250° F.

In the preferred embodiment of making the additive ingredient of the composition, the reaction indicated by the observed facts appears to be one in which sulfur replaces at least a portion of the oxygen in the organic compound and the displaced oxygen combines with the phosphorus to form a phosphorus and oxygen containing compound which is separable as a residue or a sludge. When a thiophosphate is formed the phosphorus content of the sulfide or at least a part thereof is combined in the reaction product. The temperature at which the preferred reaction begins varies somewhat with the oxygen containing raw material but in general it is above about 250 to 270° F.

This is not meant to say that when the invention is practiced on a commercial scale the preferred embodiment reaction product will not contain any phosphorus and oxygen and it may contain as high as about 2% each of phosphorus and oxygen. Generally the amounts are less than the oxygen content of the original reacting material and less than the oxygen content of a true thiophosphate. Similarly, the amount of phosphorus is less than would be present if all of the phosphorus of the phosphorus sulfide combined with the oxygen containing organic compound.

In making the additive ingredient of the preferred embodiment it is also desirable that the amount of the phosphorus sulfide be at least equivalent to the theoretical quantity required for the sulfur of the sulfide to replace the oxygen of the organic compound. Inasmuch as the atomic weight of sulfur is just about double that of oxygen, it is desirable to use about an amount of phosphorus sulfide such that the weight of the sulfur therein is about double the weight of the oxygen contained in the oxygen compound. This is not essential but there is generally no advantage of having unreacted raw material remaining in the reaction product. The range is usually 15 to 30% of the sulfide based on the oxygen containing raw material. A small excess over and above the theoretical amount may be of assistance in forcing the reaction to completion. The small excess of the theoretical amount may be 1 to 10%. There is also the possibility that any large excess may remain dissolved in the reaction product, and there appears to be little advantage of the inclusion of phosphorus and sulfur in the reaction product uncombined with the oxygen containing material.

The phosphorus sulfide to be used preferably is phosphorus pentasulfide, since this is the most readily available commercial form of the phosphorus sulfides and the reaction proceeds well with it. Any other phosphorus sulfide however may be used, for example, phosphorus sesquisulfide.

The additive ingredient can be made from any of a wide variety of oxygen containing organic compounds or mixtures thereof as the raw materials. Preferably these raw materials have a boiling point above the reaction temperature in order to maintain them in a non-vapor phase in the reaction zone without the use of pressure. If the reaction temperature, for instance, is 270 to 350° F., this suggests that the organic oxygen containing raw material should have a boiling point above a temperature in this range.

The organic oxygen containing material must also be such that upon reaction with the phosphorus sulfide the reaction product is soluble or miscible in a hydrocarbon lubricating oil or grease. In general, the organic oxygen containing raw materials which are oil-soluble result in oil soluble reaction products with the phosphorus sulfide. Other than the above there is no limitation on the oxygen containing raw material which may be used in making the additive ingredient of the new composition.

Included in the various oxygen containing materials are alcohols, for example, lauryl alcohol, stearyl alcohol and oleyl alcohol as illustrative of the monoatomic alcohols, and various glycols and glycol polymers as illustrative of the polyatomic alcohols. Phenols with or without side chains and cyclic alcohols are additional examples.

Organic acids may be used such as the saturated and unsaturated fatty acids, i. e., caproic, myristic, palmitic and stearic, and higher molecular weight fatty acids, also oleic and unsaturated fatty acids. In general it is preferred that the fatty acid contain at least 10 carbon atoms. Polybasic acids are additional examples. The various naphthenic and cyclic acids, such as acids derived from mineral oils may be used, and also aromatic acids, such as naphthalic, benzoic and naphthoic acids.

The additive ingredient can be made from esters, for example, fatty acid esters of monoatomic alcohols. Examples are cetyl palmitate, methyl, ethyl, propyl and butyl palmitates, oleates, stearates; cetyl, stearyl or oleyl propionates or butyrates; and esters in which both the acid and alcohol radical are intermediate molecular weights, such as octyl caproate. Esters of fatty acid esters of polyatomic alcohols, such as glycols and glycerol may be used. In the latter group is contained the wide variety of naturally occurring animal and vegetable oils and fats such as tallow, palm oil, cocoanut oil, etc.

Other organic oxygen containing compounds include the ketones, such as dialkyl and aryl alkyl ketones, aldehydes and ethers of sufficiently high molecular weight to have the requisite boiling point, particularly those having at least 10 carbon atoms.

Any of the above mentioned compounds may be of the substituted type, such as the halogenated compounds, illustrative of which are chlorobenzoic acid, dichlorostearic acid, methyldichlorostearate, methylchloronaphthenate and dichlorobenzoic acid; also hydroxy substituted compounds, such as hydroxystearic acid, dihydroxybenzoic acid, hydroxynaphthenic acid, dihydroxystearic acid and dichlorodihydroxystearic acid. The organic compounds may be derived from a mineral source such as fatty acids from petroleum and oxidized petroleum fatty acids, oxidized oils, such as used crank case oil containing a substantial amount of oxygen containing compounds.

Any of the above compounds may be used in admixture with each other or in admixture with other compounds in which the oxygen containing compound is the predominant ingredient of the mixture.

Preferably the compound or mixture thereof should not be too unsaturated. The aliphatic compounds having an iodine value over about 25 to 50 give somewhat lower yields because of their tendency to polymerize more readily. If desired, the iodine value of any of the compounds may be reduced by hydrogenation.

The oil soluble detergent, which is the last mentioned ingredient of the composition, preferably is of the sulfonated type and has the general formula $R.SO_3.M$ where R is a radical or residue containing a lipophilic residue, i. e., 10 or more carbon atoms and where M is a basic cation, i. e., a metal such as any alkali metal or alkaline earth metal, aluminum, lead, tin, etc., or an organic basic radical, such as ammonium or an amine radical.

The sulfonated detergents of the above type include those in which the above defined $—SO_3.M$ group is linked through oxygen to the radical containing the lipophilic group. The latter are sometimes referred to as sulfated compounds of the more specific formula $R—O—SO_3.M$, and are the preferred species but are included within the generic designation of sulfonated compounds. Other oil soluble detergents which may be used are soaps.

Inasmuch as all of the detergents above mentioned contain a lipophilic group or residue, they are oil soluble and also possess excellent detergent characteristics because of the presence of the basic cation. In general, the water attracting group is relatively mild. The art well understands what compounds do and do not fall within the group of oil soluble detergents, especially the sulfonated detergents, and further definition is unnecessary.

Examples of these detergents are the alkyl sulfonates including sulfates and mixtures of the same of the general formula $R—SO_3.M$ and $R—O—SO_3.M$ where R is an aliphatic radical having 8 or more carbon atoms and M is a basic cation, preferably an alkali metal. Especially desirable are the compounds derived from cocoanut fatty oil alcohols by separation and reduction and the treatment thereof with sulfuric acid, and of these the lauryl compounds are outstanding. Such compounds are available under a variety of names.

Other compounds of this same general type are the sulfonated detergents including sulfated aliphatic esters in which the sulfonic group is introduced by means of a double bond in the hydrocarbon chain or by means of a hydroxy group in the compound.

Another example is the amide type derivatives, such as obtained by reacting a fatty acid halide with taurine or a salt thereof, giving products of the general formula $$R-CO-NH-(CH_2)_x-SO_3.M$$

where R is an aliphatic radical having at least 8 carbon atoms, $x$ is a small whole number and M is a basic cation. Another example in the class has the formula $$R-COO-(CH_2)_x-NH-CO-(CH_2)_x-SO_3.M$$

where R, $x$ and M are defined in the same way.

Another large class includes the alkyl aryl sulfonates of the general formula $R-C_6H_5SO_3.M$, where R is an aliphatic radical of at least 8 carbon atoms and M is a basic cation.

Another type is the sulfosuccinates of the general formula $$R-O-CO-CH-SO_3.M-CH_2COO-R$$

where R is an aliphatic radical having a total of at least 8 in both R radicals, and M is a basic cation.

The amounts of the three ingredients may be dependent partially upon the particular duty in view. Thus, for internal combustion engine oils the amount of the reaction product of phosphorus sulfide and the oxygen containing organic compound may be 0.01 to 25%; the amount of the oil soluble detergent may be the same but generally not over 5%. When the oil is not to be subjected to drastic heat conditions, lesser amounts of both agents may be employed, as for instance 1 to 10% of the additive and 0.5 to 5% of the detergent. For service as a lubricant for hypoid type gears, the phosphorus sulfide reaction product may be considerably increased, for example 10 to 20%, and in gear uses this amount may even be larger.

As illustrative of the invention, a composition is made from a Mid-Continent base lubricating oil containing 0.5% sodium lauryl sulfate $$(C_{12}H_{25}-O-SO_3Na)$$

as the detergent and 0.5% of the reaction product of $P_2S_5$ and cetyl palmitate as the additive. The reaction product is prepared by reacting a commercial product which is primarily cetyl palmitate with 20% of $P_2S_5$ for 4 hours at 300° F., following which the reaction product is settled from any sludge and decanted. The oil containing the additive and the detergent has excellent properties in that a minimum, if any, lacquer is deposited upon the pistons of an engine; the corrosion is a minimum, if any, and the sludge formation is a minimum, if any. This combined result would not be expected from a knowledge of the properties of the individual ingredients.

As another example, the lubricating oil (SAE 30) has mixed with it 5% of a $P_2S_5$-cocoanut oil additive and .15% of sodium keryl benzene sulfonate $C_{16}H_{33}C_6H_5SO_3Na$. The $P_2S_5$-cocoanut oil additive is prepared by reacting cocoanut oil with 30% of $P_2S_5$. The latter is added in increments so that the temperature does not exceed 350° F. and after all of the $P_2S_5$ is added the reaction is continued at a temperature of 290 to 310° F. for 90 minutes and further treated in accordance with the previous example.

As a further example, a lubricating oil (SAE 20) has added to it 3% of $P_2S_5$-stearic acid additive obtained by reacting stearic acid with 25% of $P_2S_5$ at a temperature of 290 to 325° F., and .5% of sodium cetyl sulfate.

As an additional example, a lubricating oil (SAE 30) is mixed with 5% of the reaction product of 30% $P_2S_5$ reacted with dipalmityl ketone at a temperature of 300° F., and 1% of keryl benzene sulfonate.

I am aware of the fact that it has been proposed heretofore to add to lubricating oils sulfonic derivatives, such as those known as mahogany sulfonates. Oils containing such sulfonic derivatives alone are very corrosive and in fact more corrosive than the oil itself. The $P_2S_5$ additives would not be expected to reduce this aggravated corrosive condition to a tolerable level. The fact that it does, and in many instances gives results superior to that obtained with the additive alone is surprising. As a result, the beneficial effects of the detergent are obtained without or with a minimum of its disadvantages.

The invention claimed in this application does not contemplate the use of any detergent or sulfonated ingredient apart from the sulfide-oxygen containing reaction product and the novel results of my invention are not obtainable except in the use of a sulfonated compound with said reaction product.

I claim:

1. A lubricating oil composition comprising a major amount of lubricating oil, from about 0.01 to about 25% of the reaction product obtained by reacting, an oil-soluble oxygen-containing organic compound selected from the group consisting of fatty acids and fatty acid esters with a phosphorus sulfide at a temperature from between about 175° F. to about 450° F. and in amounts such that the weight of the sulfur in the phosphorus sulfide is about double the weight of the oxygen in said organic compound and from about 0.01 to about 25% of an oil-soluble detergent selected from the class consisting of organic sulfonates and organic sulfates.

2. A lubricating oil composition comprising a major amount of lubricating oil, from about 0.01 to about 25% of the reaction product obtained by reacting an oil-soluble oxygen-containing organic compound selected from the group consisting of fatty acids and fatty acid esters with a phosphorus sulfide at a temperature from between about 270° C. to about 450° C. in amounts such that the weight of the sulfur of the phosphorus sulfide is about double the weight of the oxygen in said organic compound and from about 0.01 to about 25% of an oil-soluble detergent selected from the class consisting of organic sulfonates and organic sulfates.

3. A lubricating oil composition comprising a major amount of lubricating oil, from about 0.01 to about 25% of the reaction product obtained by reacting an oil-soluble oxygen-containing organic compound selected from the group consisting of fatty acids and fatty acid esters with phosphorus pentasulfide at a temperature from between about 270° C. to about 450° C. in amounts such that the weight of the sulfur of the phosphorus pentasulfide is about double the weight of the oxygen in said organic compound and from about 0.01 to about 25% of an oil-soluble detergent selected from the class consisting of organic sulfonates and organic sulfates.

4. A lubricating oil composition comprising a major amount of lubricating oil, from about 0.01 to 25% of the reaction product having a relatively high sulfur content and a relatively low phosphorus content resulting from the reaction of an oil-soluble oxygen-containing organic compound selected from the group consisting of fatty acids and fatty acid esters with from 15 to 30% of a phosphorus sulfide at a temperature from between about 270° F. to about 450° F., which reaction product is separated from a sludge, and from about 0.01 to about 25% of an oil soluble detergent selected from the class consisting of organic sulfonates and organic sulfates.

5. A lubricating oil composition comprising a major amount of lubricating oil, from about 0.01 to 25% of the reaction product obtained by reacting an oil-soluble fatty acid with phosphorus pentasulfide at a temperature from between about 270° F. to about 450° F. and in amounts such that the weight of the sulfur of said phosphorus pentasulfide is about double the weight of the oxygen in said fatty acid, and from about 0.01 to about 25% of an oil soluble detergent selected from the class consisting of organic sulfonates and sulfate.

6. A lubricating oil composition comprising a major amount of lubricating oil, from about 0.01 to 25% of the reaction product obtained by reacting an oil-soluble fatty acid ester with phosphorus pentasulfide at a temperature from between about 270° F. to about 450° F. and in amounts such that the weight of the sulfur of the phosphorus pentasulfide is about double the weight of the oxygen in said fatty acid ester, and from about 0.01 to about 25% of an oil soluble detergent selected from the class consisting of organic sulfonates and sulfate.

7. A lubricating oil composition comprising a major amount of lubricating oil, from about 0.01 to 25% of the reaction product obtained by reacting an oil-soluble glyceride ester of a fatty acid with phosphorus pentasulfide at a temperature from between about 270° F. to about 450° F. and in amounts such that the weight of the sulfur of the phosphorus pentasulfide is about double the weight of the oxygen in said glyceride ester, and from about 0.01 to about 25% of an oil soluble detergent selected from the class consisting of organic sulfonates and sulfate.

8. A lubricating oil composition comprising a major amount of lubricating oil, from about 0.01 to 25% of the reaction product obtained by reacting an oil-soluble cocoanut oil with phosphorus pentasulfide at a temperature from between about 270° F. to about 450° F. and in amounts such that the weight of the sulfur of the phosphorus pentasulfide is about double the weight of the oxygen in said cocoanut oil, and from about 0.01 to about 25% of an oil soluble detergent selected from the class consisting of organic sulfonates and sulfate.

9. A lubricating oil composition comprising a major amount of lubricating oil, from about 0.01 to 25% of the reaction product obtained by reacting an oil-soluble stearic acid with phosphorus pentasulfide at a temperature from between about 270° F. to about 450° F. and in amounts such that the weight is about double the weight of the oxygen in said stearic acid, and from about 0.01 to about 25% of an oil soluble detergent selected from the class consisting of organic sulfonates and sulfate.

10. A lubricating oil composition comprising a major amount of lubricating oil, from about 0.01 to 25% of the reaction product obtained by reacting oil-soluble fatty acid with phosphorus pentasulfide at a temperature from between about 270° F. to about 450° F. and in amounts such that the weight of the sulfur of the phosphorus pentasulfide is about double the weight of the oxygen in said fatty acid, and from about 0.01 to about 25% of an oil soluble organic sulfonate detergent.

11. A lubricating oil composition comprising a major amount of lubricating oil, from about 0.01 to 25% of the reaction product obtained by reacting an oil-soluble fatty acid ester with phosphorus pentasulfide at a temperature from between about 270° F. to about 450° F. and in amounts such that the weight of the sulfur of the phosphorus pentasulfide is about double the weight of the oxygen in said fatty acid ester, and from about 0.01 to about 25% of an oil soluble organic sulfonate detergent.

12. A lubricating oil composition comprising a major amount of lubricating oil, 1 to 10% of the reaction product obtained by reacting 15 to 30% of phosphorus pentasulfide with cocoanut oil at a temperature of from about 270° F. to about 450° F. and 0.5% to 5% of an oil-soluble detergent selected from the group consisting of organic sulfonates and sulfates.

JOHN M. MUSSELMAN.

REFERENCES CITED

The following references are of record in the file of this patent:

UNITED STATES PATENTS

| Number | Name | Date |
| --- | --- | --- |
| 2,063,629 | Salzberg et al. | Dec. 8, 1936 |
| 2,252,985 | Rutherford et al. | Aug. 19, 1941 |
| 2,270,577 | Bergstrom | Jan. 20, 1942 |
| 2,308,427 | Roehner | Jan. 12, 1943 |
| 2,342,027 | Waugh | Feb. 15, 1944 |
| 2,357,211 | Lincoln | Aug. 29, 1944 |
| 2,361,804 | Wilson | Oct. 31, 1944 |
| 2,365,209 | Musselman | Dec. 19, 1944 |

Certificate of Correction

Patent No. 2,480,873                                          September 6, 1949

JOHN M. MUSSELMAN

It is hereby certified that errors appear in the printed specification of the above numbered patent requiring correction as follows:

Column 8, line 11, after the word "weight", first occurrence, insert *of the sulfur of the phosphorus pentasulfide*; following line 55, list of references cited, add the following:

*2,279,086*      *Bergstrom* ------------------------------ *Apr. 7, 1942* and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*